United States Patent [19]
Kielma

[11] Patent Number: 4,507,850
[45] Date of Patent: Apr. 2, 1985

[54] BORING BAR ADJUSTING APPARATUS

[75] Inventor: Ervin J. Kielma, West Allis, Wis.

[73] Assignee: Kearney & Trecker Corporation, Milwaukee, Wis.

[21] Appl. No.: 563,110

[22] Filed: Dec. 19, 1983

[51] Int. Cl.³ .................. B23Q 3/157; B23Q 15/22
[52] U.S. Cl. ................................... 29/568; 408/2; 409/218
[58] Field of Search .............. 29/568; 409/127, 218; 408/2; 414/730

[56] References Cited

U.S. PATENT DOCUMENTS

| | | | |
|---|---|---|---|
| Re. 26,904 | 6/1970 | Lemelson | 414/730 |
| 3,094,899 | 6/1963 | Otis | 409/127 |
| 3,191,294 | 6/1965 | Daugherty | 29/568 |
| 4,204,782 | 5/1980 | Spits et al. | 408/3 |
| 4,400,118 | 8/1983 | Yamakage et al. | 409/127 X |

FOREIGN PATENT DOCUMENTS 2502203  7/1976  Fed. Rep. of Germany .

Primary Examiner—Z. R. Bilinsky
Attorney, Agent, or Firm—Quarles & Brady

[57] ABSTRACT

A boring bar adjusting mechanism for automatically correcting an offsize boring cutter. The mechanism includes a measuring gauge and an adjustable boring bar, each mounted in separate tool holders and each stored in the tool storage magazine. The measuring gauge is transferred to the spindle by the machine tool transfer mechanism after a conventional boring operation is completed to measure the work-piece bore. If the bore is inaccurate, the measuring gauge is removed and the boring bar, is loaded into the spindle. The cutting element of the boring bar is adjusted automatically by an adjusting mechanism in response to the bore size measured by the measuring head so that it will machine an accurate bore.

3 Claims, 12 Drawing Figures

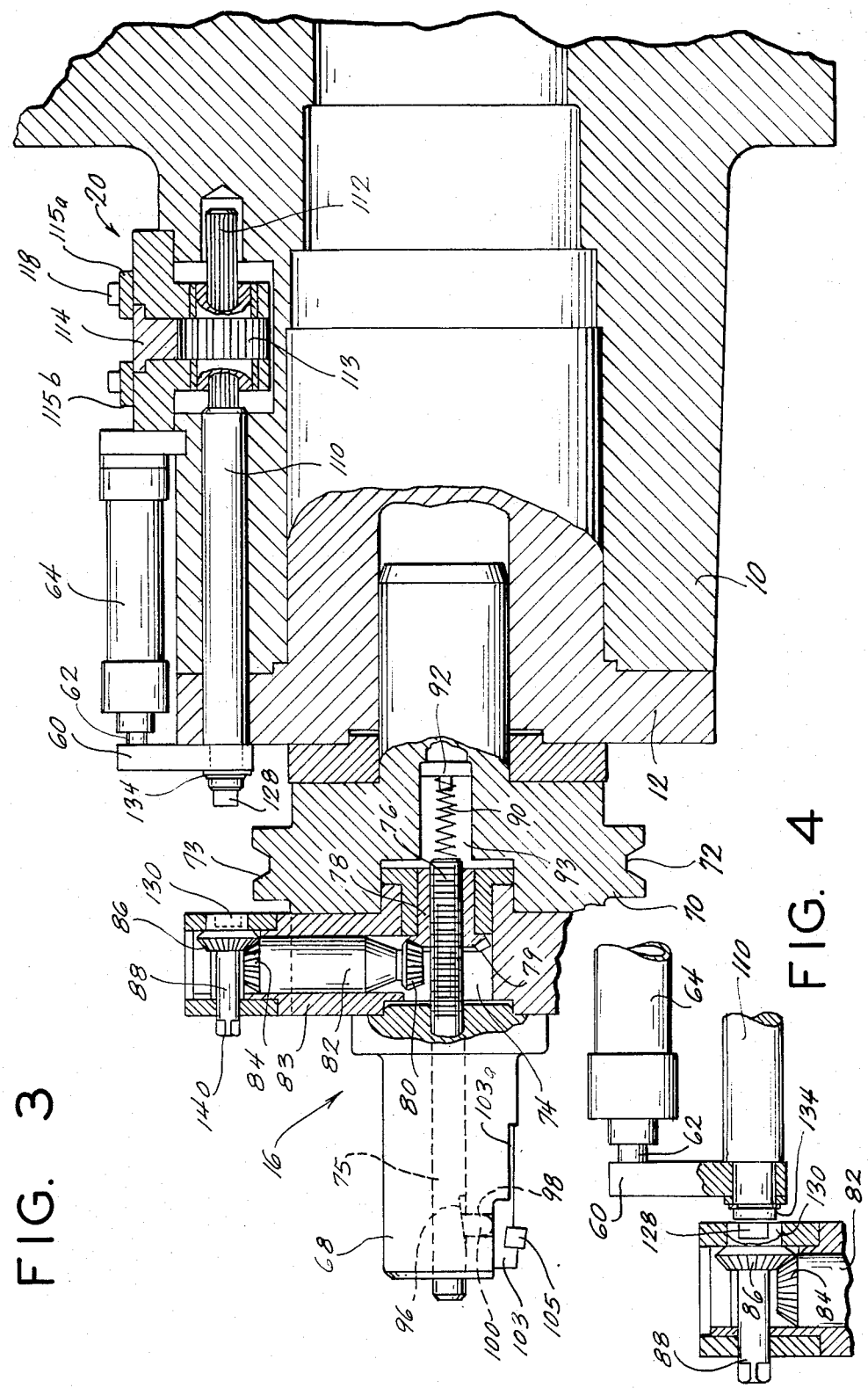

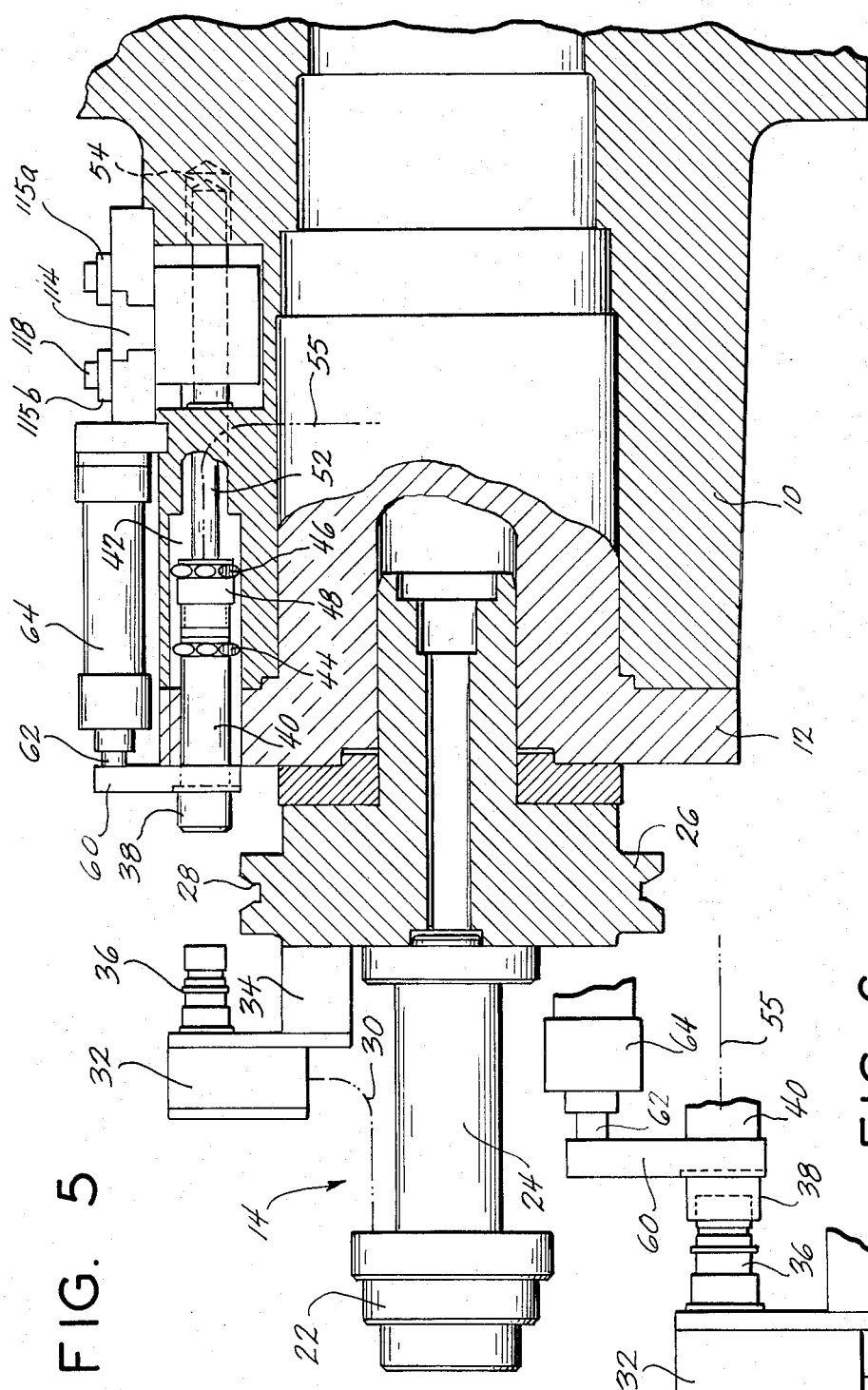

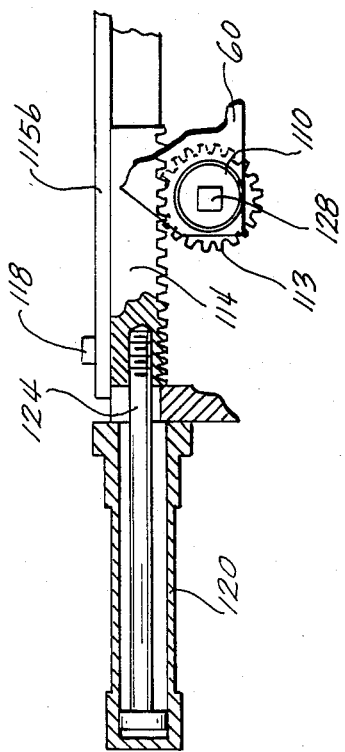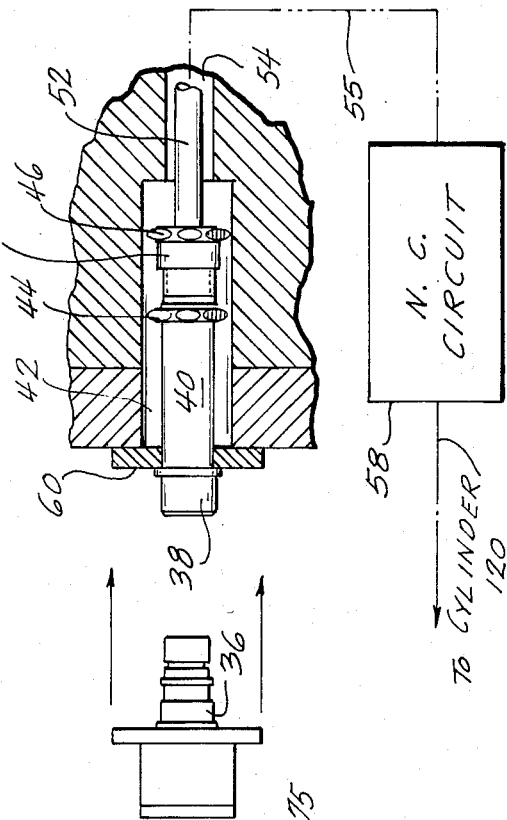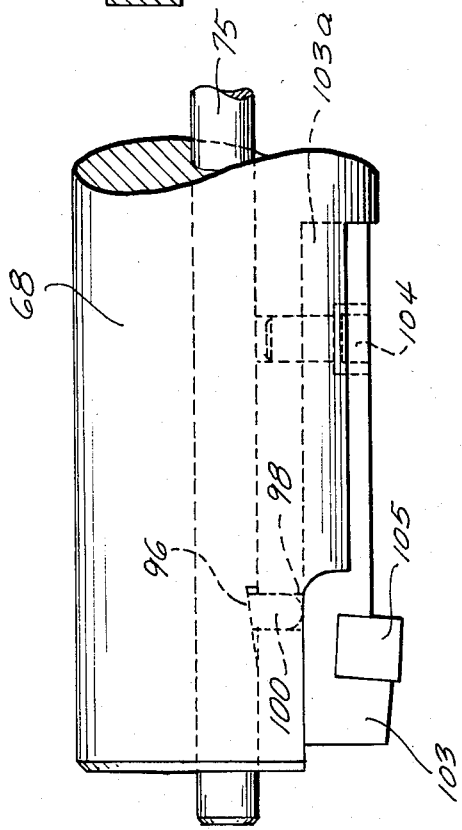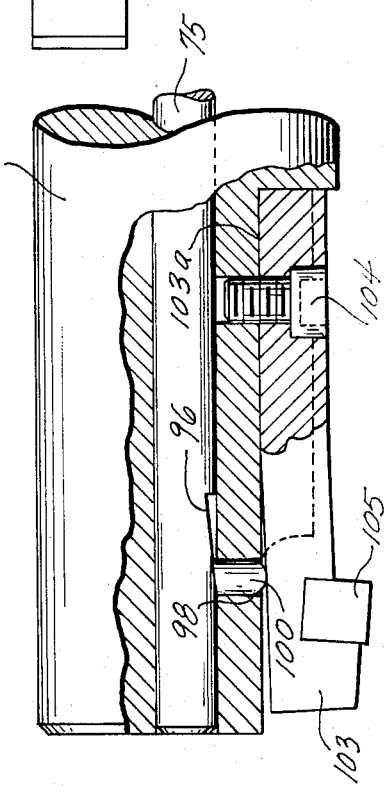

BORING BAR ADJUSTING APPARATUS

BACKGROUND OF THE INVENTION

This invention relates generally to machine tools and in particular to a boring bar adjusting apparatus for automatically measuring the diameter of a hole produced by the boring in the spindle of the machine tool and automatically adjusting the boring bar if the hole is not within tolerances.

Many of the boring operations completed on workpieces produced in manufacturing facilities are performed by computer numerically controlled (CNC) machining centers. Often, such machining centers include an automatic tool changer which transfers tools between the machine tool storage magazine and the machine tool spindle without the need for manual intervention. Such automatic tool changing machine centers not only increase production, but also reduce direct labor costs.

To achieve relatively high production, while still affording the flexibility of manufacturing different types of parts, manufacturing cells, and flexible manufacturing systems have been developed utilizing machining centers that are interconnected by way of a workpiece transfer or shuttle mechanism. In such manufacturing cells and flexible manufacturing systems, once the part has been machined, the part is usually inspected to assure that the part meets manufacturing tolerances. Such inspection can be accomplished at the machine tool, by way of a spindle probe, but more often, part inspection generally occurs at a separate inspection station, which may include one or more automatic inspection devices. If, during the inspection process, the part does not meet manufacturing tolerance, such as may occur when a workpiece bore is slightly undersized, by virtue of having been machined by a worn cutting tool, then the part is diverted for subsequent machining. In large manufacturing facilities the diversion of parts to be remachined often creates a logistics difficulty which may seriously impede part production.

In an effort to overcome this difficulty, the present invention is directed to an automatic boring bar adjustment apparatus for a machine tool. The invention provides for measuring the hole produced by the boring bar and automatically adjusting the boring bar to compensate for any error in the diameter of the hole and then reboring the hole to the proper diameter.

BRIEF SUMMARY OF THE INVENTION

In accordance with the preferred embodiment of the invention, there is provided a boring bar adjusting apparatus for automatically measuring the workpiece bore size produced by the boring bar and adjusting the boring bar, if necessary. The invention includes a measuring gauge or head mounted in a tool holder stored in the machine tool storage magazine for transfer to the machine tool spindle by an automatic tool changer. When the workpiece bore is measured by the measuring head and is found to be undersize, the measuring head is exchanged with a boring bar mounted in a tool holder normally stored at the machine tool storage magazine. The boring bar carries a cutting insert that is adjustable to vary the size of the bore cut by the cutting insert. Upon transfer of the boring bar to the machine tool spindle, an actuating mechanism, carried by the machine tool, engages the boring bar in the spindle to adjust the cutting tool to change the diameter of the bore produced by it. The actuating mechanism is controlled by a numerical control circuit in accordance with the difference between actual bore size as measured by the measuring head and the desired bore size so that the boring bar can be set to accurately machine the workpiece bore.

It is an object of the present invention to provide an automatic boring bar adjusting apparatus for measuring the workpiece bore size and automatically adjusting the size of the bore in response to the measurement. A measuring gauge is mounted in a tool holder stored in the tool storage magazine for automatic transfer to the spindle upon the completion of a boring operation to measure the diameter of the bore. After the measurement has been completed, the boring bar used to bore the hole is removed from the tool storage magazine and exchanged with the measuring gauge so that it can be automatically adjusted to produce the required diameter bore in the workpiece.

Other objects and advantages of the present invention will become apparent from the following specification.

BRIEF DESCRIPTION OF THE DRAWINGS

The features of the invention believed to be novel are set forth with particularity in the appended claims. The invention itself, however, both as to organization and method of operation, together with further objects and advantages thereof may best be understood by reference to the following description taken in conjunction with the accompanying drawings in which:

FIG. 3 is a fragmentary view partially in section and viewed from the plane of the line 3—3 of FIG. 1 illustrating the details of the boring bar and actuating mechanism therefor;

FIG. 4 is a detail view partially in section of the boring bar of FIG. 3 showing the engagement of the boring bar actuating mechanism with the boring bar;

FIG. 5 is a fragmentary view partially in section and viewed from the plane of the line 5—5 of FIG. 2 illustrating the details of the measuring head of the present invention;

FIG. 6 is a detail view showing the measuring head of FIG. 5 and illustrating the engagement of the measuring head connector with the measuring head jack on the machine tool;

FIG. 9 is a fragmentary view partially in section and viewed from the Plane of the line 9—9 of FIG. 8 illustrating additional details of the actuating mechanism;

FIG. 10 is a cutaway detail view of the machine tool spindle head illustrating the connection of the measuring head jack on the machine tool to a numerical control circuit;

FIG. 11 is an enlarged, detail view of the boring bar of FIG. 5 showing the cutting insert carried thereby at its radially inward most position; and FIG. 12 is an enlarged fragmentary view partially in section of the boring bar of FIG. 5 showing the cutting insert carried thereby at a radially outward position.

DETAILED DESCRIPTION OF THE PREFERRED EMBODIMENT

Figure 1:
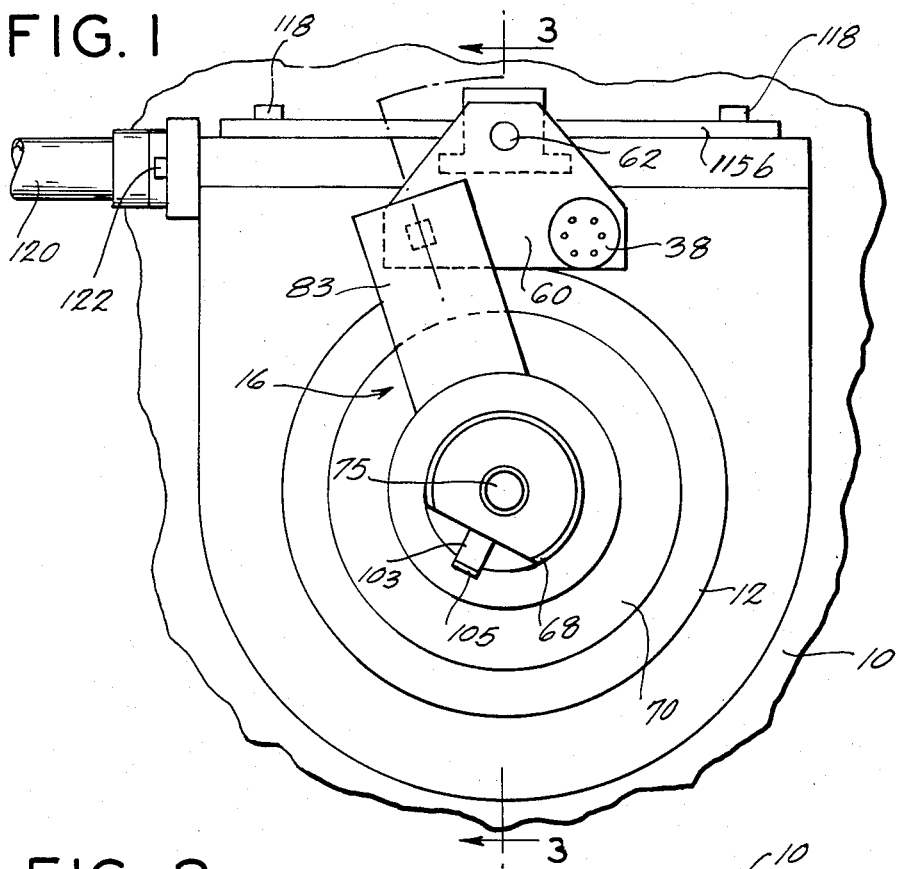
FIG. 1 is a front fragmentary view in elevation of the spindle head of a machine tool illustrating the boring bar of the present invention mounted in the spindle therein.
Figure 2:
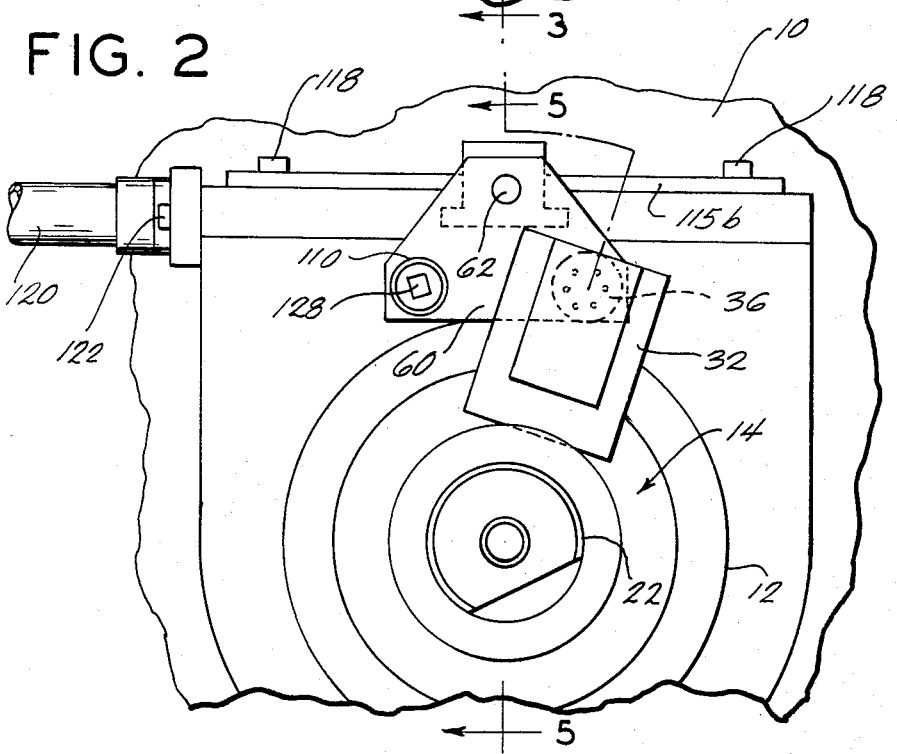
FIG. 2 is a front fragmentary view in elevation of the spindle head of a machine tool showing the measuring head of the present invention mounted therein.
Figure 7:
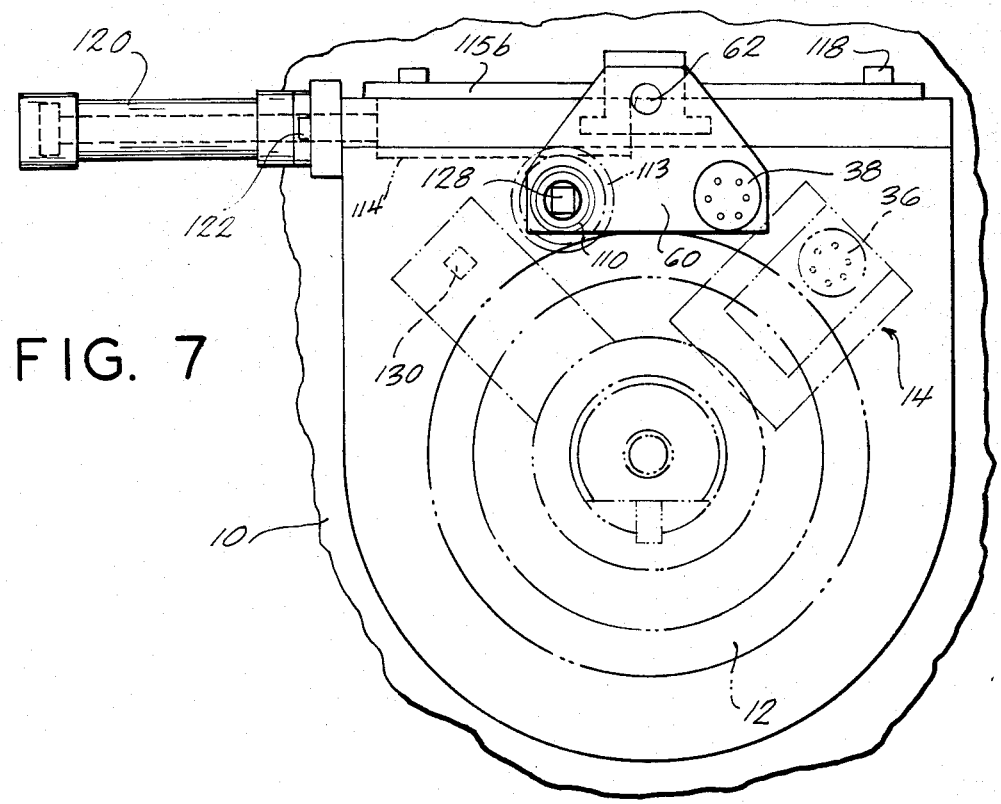
FIG. 7 is a front fragmentary view of the machine tool spindle head illustrating both the measuring gauge and boring means in phantom to depict how each is positioned in the spindle.

Referring now to the drawing, FIG. 1, 2 and 7 illustrate a partial frontal view of the spindle head 10 carried by a machine tool. Generally the machine tool which carries spindle head 10 is an automatic-tool changing such as are well known in the art. Rotatably journaled in the spindle head 10 is a spindle 12 driven by a motor which is controlled by the numerical control circuit. Such controls are well known in the art and are capable of positioning the spindle at a precise angular orientation.

Prior to a machining operation, the cutting tool then in the spindle is exchanged by the tool changer with the desired cutting tool, such as a boring tool and the machining operation is performed by relating the spindle while moving it axially to feed the tool into the workpiece. Upon completion of a cutting operation, the tool in the spindle 12 is replaced with another tool so that the next cutting operation can be performed.

Although cutting tools are manufactured from extremely hard alloys, boring tool wear is nevertheless inevitable. As the boring tool wears, the outer diameter of the boring tool decreases and as a consequence, the workpiece bore cut becomes undersize. If the boring tool wear is substantial, the workpiece bore size may fall outside of manufacturing tolerances. This may necessitate part rework. Often, the part must be transferred to another machine to properly size the workpiece bore.

In order to avoid such error, the present invention provides an automatic boring bar adjusting apparatus comprised of a measuring head 14 (illustrated in FIG. 5), a boring bar 16 having a radially adjustable cutting insert 105 (illustrated in FIG. 3), and actuating means 20 (illustrated in FIG. 3) for adjusting the boring bar in response to the bore size measured by the measuring gauge so that the boring bar 16, when driven by the spindle 12, forms the required hole with precision.

Referring to FIG. 5, the measuring head 14 includes a multiple diameter linear variable differential transformer (LVDT) 22 which is mounted at one end of a shaft 24 by a recoil shock mount (not shown) located within the transformer 22. The opposite end of shaft 24 is secured to a tool holder 26 to enable the assembly to be stored in the tool storage magazine and to be received by the spindle 12. The tool holder 26 is conventional in its construction and is provided with an outer annular groove 28 in its periphery, to enable the tool holder 26 to be gripped by the automatic tool changer (not shown) of the machine tool.

The linear variable differential transformer 22 is electrically connected to cable 30 (shown by a broken line), which feeds into a junction box 32 mounted to the forward face of its associated tool holder by a right angle mounting bracket 34. Therefore, the junction box 32 extends radially outwardly from the outer periphery of the tool holder 26. Extending rearwardly from the junction box 32 is a connector 36 electrically connected by cable 30 to the transformer 22. The connector 36 is adapted to engage a connecting jack 38.

Connecting jack 38 is mounted to the end of a conduit stub 40 which is slidably disposed in a recess 42 in the machine tool spindle head so as to be parallel to the spindle 12. The conduit stub 40 is guided within the recess 42 by a nut 44 threaded onto the rearward (rightward) end of the conduit stub and a second nut 46 threaded about the rearward end of a collar 48 which has its forward end threaded into the end of the conduit stub 40. Additional guiding for the conduit stub 40 is provided by a hollow shaft 52 extending rearwardly from the collar 48 into a recess 54 coaxial to, and in communication with the recess 42. The conduit stub 40, the collar 48 and the hollow shaft 52 are all in communication with one another so that a connecting cable 55 extends therethrough for connection to the jack 38. As illustrated in FIG. 10, the cable 55 couples the jack 38 to a numerical control circuit 58 which is conventional and of well known construction.

Returning to FIG. 5, a yoke 60 mechanically links the jack 38 on the end of the conduit stub 40 to the end of a shaft 62 of a piston and cylinder mechanism 64 which is mounted on the top of the machine tool spindle head 10. When piston and cylinder mechanism 64 is actuated, the shaft 62 of the cylinder is urged outwardly to move the jack 38 into mating engagement with connector 36 to effect electrical connection therewith in the manner illustrated in FIG. 6.

Referring now to FIG. 7, before the connector 36 of the measuring head can be mated with jack 38, the connector must be axially aligned with the jack. Such alignment is accomplished by the control which stops the spindle rotation at the particular angular orientation in which the connector 36 aligns with jack 38.

Once jack 38 is engaged with plug 36 as described, the transformer 22 of the measuring head 14 is connected to the numerical control circuit 58 of FIG. 10. Upon connection to the transformer 22, the numerical control circuit 58 of FIG. 10 operates to determine the workpiece bore size in accordance with the output signal of the transformer 22. The numerical control circuit 58 compares the actual workpiece bore size to the desired bore size which is supplied to the numerical control circuit by way of a command generated by the machine tool control. If the numerical control circuit 58 determines that the actual bore size is too small, the boring bar 16 of FIG. 3 is automatically adjusted to produce the required diameter bore.

As shown in FIG. 3, the boring bar 16 comprises a head 68 which is mounted in a tool holder 70. The tool holder 70, like tool holder 28, is conventional in construction and is adapted to be handled by an automatic tool change mechanism. The head 68 of the boring bar 16 has a central recess 74 which receives a rod 75 that extends forwardly (leftwardly) from the recess 74 and out beyond the end of the head 68. Threads 76 are formed on the rearward end of the rod 75 for engagement with the threaded bore a collar 78 that is journalled in the head 68 for rotation about an axis coaxial with the axis of rod 75. The forward end of collar 78 has an integral bevel gear 79 in meshing engagement with a bevel gear 80 on a stub shaft 82 journaled within an extension housing 83 that projects radially from the head 68. The upper end of stub shaft 82 is provided with an integral bevel gear 84 in meshing engagement with a bevel gear 86 integrally formed on a drive shaft 88. The drive shaft 88 is journaled in the projecting extension housing 83 so as to be parallel to the axis of rod 75.

Upon rotation of drive shaft 88, the bevel gear 86 thereon rotates the stub shaft 82 which in turn drives the collar 78. As collar 78 rotates relative to the rod 75, the latter is threaded out from or into the head 68, depending on the direction of rotation of collar 78. The rod 75 is biased forwardly by a spring 90 interposed between the rearward end of rod 75 and the wall 92 of a recess 93 in the tool holder 70 that is in communication with recess 74 in head 68.

Referring now to FIGS. 3, 11 and 12, the rod 75 disposed through the central bore of the boring bar head 68 is provided with a notch 96 having an inclined wall that is in communication with a radially disposed passageway 98 in the boring bar head 68. An adjusting pin 100 is disposed in the passageway 98 so as to be interposed between the notch 98 and the inner edge of a cutting tool insert-holding cartridge 103 that is seated in a pocket 103a in the outer periphery of the head 68 and is cantilevered at its rearward end to the boring bar head 68 by a bolt 104 threaded radially inwardly into the boring bar head. The cartridge 103 is conventional in its construction and carries a cutting tool insert 105 which performs a cutting operation upon rotation of the boring bar head 68.

When rod 75 is shifted inwardly or rightwardly as viewed in FIG. 12, upon rotation of the drive shaft 88, the pin 100 is urged radially outwardly by the inclined surface of the notch 96 in the rod 75. Such movement of the pin 100 against the cartridge 103 forces the cutting insert 105 radially outwardly for increasing the cutting insert orbit to correspondingly increase the diameter of the bore made thereby. Thus, by regulating the axial position of rod 75, the orbit of insert 105 can be controlled accordingly.

Figure 8:
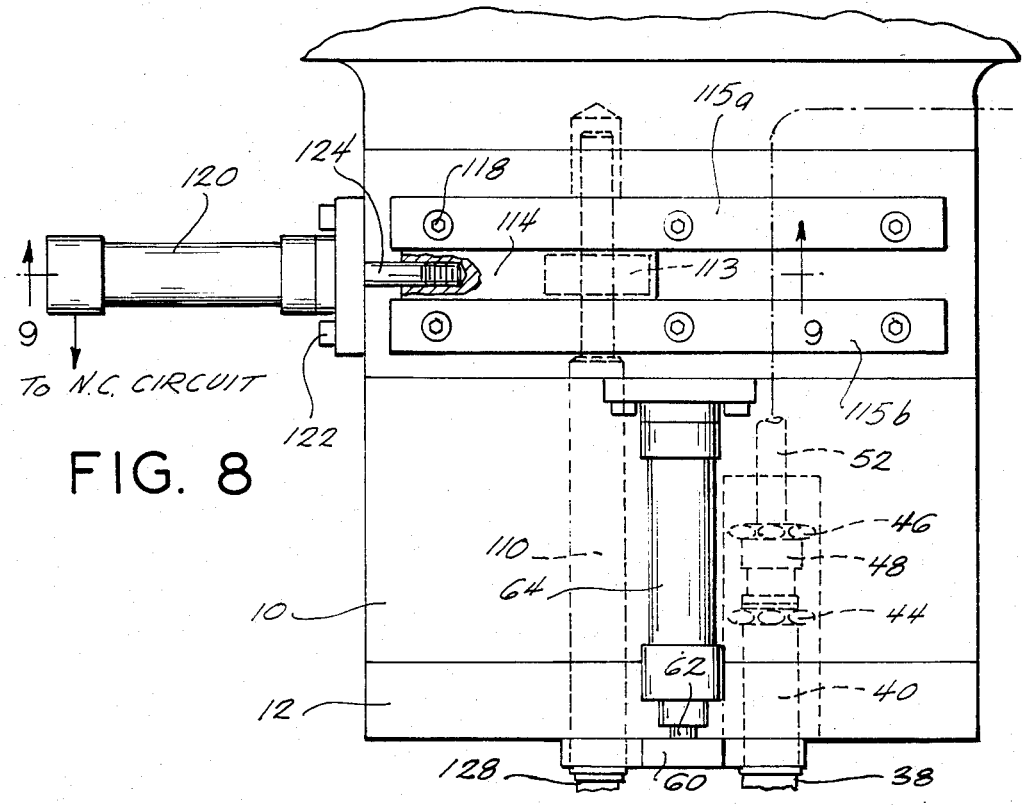
FIG. 8 is a plan view of the machine tool spindle head of FIG. 1, 2 and 7 illustrating the details of the actuating mechanism which sets the cutting insert carried by the boring bar.

The details of the actuating mechanism 20 that serves to drive the shaft 88 which in turn causes the axial movement of rod 75 to vary the orbit of the cutting insert may best be appreciated by reference to FIGS. 3, 8 and 9. Referring to FIG. 3, a drive member 110 is journaled through the spindle head 10 into the yoke 60 so as to be parallel to but offset from the spindle 12. The rearward end of the drive member 110 has splines 112 which engage the splines on the central bore of a gear 113. The splined engagement of drive member 110 with gear 113 permits the drive member 110 to be shifted axially relative to the gear 113 without interrupting the driving engagement therebetween. The gear 113 engages the teeth of a gear rack 114 slidably mounted on a set of rack ways and retained thereon by retainers 115a and 115b secured to the spindle head by bolts 118. The rack and the rack ways are perpendicular to the axis of rotation of gear 113 and drive member 110. Referring now to FIGS. 8 and 9 jointly, a cylinder 120, is secured to the spindle head 10 by bolts 122 (FIG. 8) and has its shaft 124 threaded into one end of the rack 114. Cylinder 120 is controlled by numerical control circuit 58 (FIG. 10) and upon actuation of the cylinder 120 by the numerical control circuit 58, the cylinder reciprocates the rack 114 to impart a rotary motion to the gear 113 and hence to the drive member 110.

The forward end of the drive member 110, as shown in FIG. 3, extending beyond yoke 60 is provided with a drive tang 128 which is complementary to the drive slot 130 in the rearward end of drive member 88 that is exposed through an opening in the housing 83. As shown in FIG. 4, when cylinder 64 is actuated to displace its shaft 62 outwardly, the yoke 60 shifts the drive member 110 outwardly from the spindle head 10 until a shoulder 134 on the forward end of the drive member 110 abuts the drive shaft 88 and the drive tang 128 mates with the drive slot 130. Once the drive tang 128 of member 110 mates with the drive slot 130, a torque is imparted by drive member 110 to the drive shaft 88 upon axial movement of the rack 114 by the cylinder 120 to appropriately set the radial outward displacement of the cartridge 103 which carries the cutting insert 105 so as to adjust the orbit of the cutting insert 105. The yoke 60 is fixed to both the drive member 110 and its drive tong 128 as well as to the conduit stub 40 and the electrical jack 38 so that actuation of the piston and cylinder mechanism will move both the jack 38 and the drive tang 128. However, as shown in FIGS. 1 and 2, the drive tang 128 is displaced from the jack 38 on the yoke 60.

Before the drive tang 128 on the drive member can be mated with the drive slot 130 on the drive shaft, the drive tang and drive slot must be in axial alignment with one another. As with the measuring head 14 of FIG. 1, such alignment is accomplished by the control stopping the spindle rotation at a particular angular orientation which brings the drive shaft 88 into axial alignment with the member 110. Thus, one angular orientation of the spindle aligns the drive slot 130 with the drive tong 128 and a second angular orientation of the spindle aligns the connector 36 of the measuring head 14 into alignment with the jack 38.

It may be desirable in certain instances to manually set the cartridge radial displacement and hence, the cutting insert orbit. To this end, the forward end of drive shaft 88 extends forwardly beyond the housing 83 and is squared at 140 to receive a crank (not shown) so that the drive shaft 88 can be manually rotated to rotate shaft 82 and collar 78 to axially shift rod 75 thereby adjusting the radial outward displacement of the insert 105.

During normal machine tool operation, the actuation of the boring bar 16, by the axial movement of rack 114 to produce the rotation of drive member 110 is controlled automatically by the numerical control circuit 58. Upon transfer of the measuring head 14 to the machine tool spindle 12 and movement of the transformer 22 into the workpiece bore, the numerical control circuit 58, which is responsive to the transformer 22 output signal, determines and records the difference between the actual bore size and the desired bore size. If the workpiece bore is too small, the boring bar 16 is transferred to the spindle and the drive member 110 of the actuating means 20 engages the boring bar 16 and rack 114 is shifted by cylinder 120 under control of the numerical control circuit 58 to set the cutting insert orbit. As may now be appreciated from the foregoing description of the boring bar adjusting mechanism of the present invention, the proper sizing of the workpiece bore may be completed automatically by the same machine tool in consecutive operation, thereby avoiding the need to transfer the workpiece to complete any part rework that may become necessary.

What has been disclosed is an automatic boring bar adjusting apparatus for a numerically controlled machine tool or the like which enables the bore of a workpiece to be measured and precisely sized automatically in consecutive operations without the need for manual intervention.

While only certain preferred features of the invention have been shown by way of illustration, many modifications and changes will occur to those skilled in the art.

It is, therefore, to be understood that the appended claims are intended to cover all such modifications and changes as fall within the true spirit of the invention.

I claim:

1. In a boring bar adjusting mechanism for a machine tool that is controlled by a numerical control circuit and which is provided with a rotary spindle for receiving cutters and operating them in a machining operation; mounting means in said spindle for receiving cutters and securing them for the performance of a machining operation; a measuring instrument adapted to be received by said mounting means; positioning means for positioning said measuring instrument in the bore of a workpiece while said measuring instrument is carried by the spindle; means in said measuring instrument adapted to produce a signal representing the diameter of the bore, a connector mounted on said measuring instrument and electrically connected thereto for supplying energy and for receiving said signal, a yoke movably mounted on the machine tool, a jack carried by said yoke and electrically connected to the numerical control circuit of the machine; shifting means for shifting said yoke for coupling said jack to said connector for electrically connecting said measuring instrument to the numerical control circuit, recording means in the numerical control circuit for reducing said signal; a boring bar adapted to be received by said mounting means in said spindle for performing a machining operation; a cutting element mounted in said boring bar for performing cutting operations; adjusting means in said boring bar for adjusting the position of said cutting element in said boring bar to vary the diameter of the bore produced by the operation of the boring bar, an actuator carried by said bore bar and connected to actuate said adjusting mechanism; a driver carried by said yoke in position to move with said yoke into and out of engagement with said actuator; and power means connected to operate said driver for actuating said adjusting mechanism through said actuator, said power means being regulated by said numerical control circuit for operation in response to said signal for precisely setting said cutting element to cut the desired diameter bore.

2. In a boring bar adjusting mechanism according to claim 1 including means in the machine tool for angularly orientating the spindle to position said electrical connector in alignment with said jack on said yoke when said measuring instrument is supported by the spindle and to position said actuator with said driver on said yoke when the boring bar is carried by the spindle so that forward movement of said yoke will move either said jack into engagement with said connector or couple said driver to said actuator.

3. In a boring bar adjusting mechanism according to claim 2 including means on said measuring instrument configured to be gripped by a tool change arm for transfer by the tool change arm from a tool storage magazine to the spindle and return; and means on said boring bar configured to be gripped by the tool change arm for transfer from a tool storage magazine to the spindle and return.

* * * * *